Patented Mar. 7, 1939

2,150,058

UNITED STATES PATENT OFFICE 2,150,058

FOOD PACKAGE

Ralph B. Frazier, Norristown, Pa., assignor, by mesne assignments, to Union Carbide and Carbon Corporation, a corporation of New York No Drawing. Application April 13, 1932, Serial No. 605,129

9 Claims. (Cl. 99—181)

Many products including foodstuffs which must be accorded special care in packaging and preserving them are packaged in metallic materials. The principal object of this invention is to provide improved composite materials for use particularly in packaging foodstuffs, all as more fully hereinafter described.

Metal foil and metal cans are commonly used to package foodstuffs and the like to prevent desiccation and spoilage of the products and to facilitate handling them. In many cases the product in contact with the metal may corrode the metal and such corrosion usually results in contamination and deterioration of the product. One of the most common examples of this condition is found in metal foil packaged processed cheese. Lead and tin foils are attacked by the materials in the cheese, probably lactic acid in particular, the foil becomes darkened, and objectionable color, odor and taste is imparted to the cheese. Aluminum foil is also corroded under the same conditions, and hydrogen or other gases are evolved causing the foil to separate from the cheese and permitting the growth of mold or similar fungi resulting in complete or partial spoilage of the cheese. The same problem, in general, may be encountered in packaging other food products, for example, packaging orange juice in tin cans.

For applications of this nature it is desirable to render the metal packaging material resistant to chemical action and impervious to gases, moisture, greases and oils. Necessarily, because of the properties of food products, such as taste, color, odor, etc., many restrictions are placed upon the materials with which they may be contacted. In order that the widest possible range of practical utility be given to the packaging materials, they should be exceptionally inert with respect to acids and acid compounds, to alkaline action, to moisture and to the conditions induced by enzymitic or yeast action. The material should also be substantially impermeable to gases and vapors generally. It is also essential that the material in contact with the foodstuff be free from volatile or soluble constituents which might impart an odor or taste to the product packaged. The packaging material should also be easily produced and pleasing in appearance.

I have discovered by test that the object of the invention may be attained, and new composite materials may be produced by providing metallic materials used for packaging purposes, particularly for foodstuffs, with a surface or surfaces which contain vinyl resins, that is, resinous products resulting from the polymerization of certain vinyl compounds. The new composite materials of my invention largely eliminate the objectionable features ordinarily present in metallic packaging agents, and fulfill the requirements outlined above; their advantages will be apparent.

Vinyl resins suitable for use in forming the materials of my invention may be formed from vinyl esters by known polymerization processes. The polymerization products of inorganic vinyl esters, such as vinyl halides, or those of organic vinyl esters, such as vinyl esters of aliphatic acids may be used. I prefer to use vinyl resins resulting from the conjoint polymerization (by which is meant polymerization of a plurality of compounds while in mutual contact) of two or more vinyl esters. For example, vinyl resins having desirable properties may be prepared by the conjoint polymerization of a vinyl halide and a vinyl ester of an aliphatic acid. Products of the conjoint polymerization of vinyl chloride and vinyl acetate in proportions ranging from about 10% to 90% by weight of the chloride are particularly desirable. Such resins are substantially water-white and transparent and they are exceptionally resistant to acids, alkalies and salts in the presence of moisture and may be used to form tough, flexible films which adhere well to metals, and which are odorless and tasteless. In addition, I have found that the characteristics of the preferred vinyl resins are retained to a very great extent when the vinyl resin is modified by the addition of a second resin or gum, a cellulose ester or a high-boiling solvent having plasticizing or softening action on the resin. Due to this property the vinyl resins may be greatly modified to meet specific requirements without materially altering the chemical properties of the resins which are necessary to the materials of this invention.

The material of my invention may be prepared by coating the metallic packaging material, at least on the surface thereof which is to be contacted with the packaged product, with a vinyl resin or vinyl resin composition. This may be done conveniently by forming a solution of the resin with or without modifying materials, applying the solution to the metal, and eliminating the solvent. In the case of metal foil this may be done by passing the foil through the solution and removing excess solution from the foil by means of doctor blades or rolls.

Vinyl resins which are formed by conjointly polymerizing vinyl chloride and vinyl acetate in proportions up to about 65% by weight of vinyl chloride are compatible with nitrocellulose, and this material may be advantageously incorporated in the composite material in varying amounts up to an amount about equal to the weight of vinyl resin. Other resins and gums, such as damar and cumar resins and ester gum, may be used in conjunction with the vinyl resin in amounts up to about 20% to 25% of the weight of vinyl resin, and plasticizers, such as dibutyl phthalate or other esters of phthalic acid, tricresyl phosphate, glycol esters, and the like, may be used with the vinyl resins in amounts up to about 25% to 35% of the weight of vinyl resin.

The solvents or solvent mixtures used in forming the new material must be capable of dissolving all of the ingredients of the composition which is to be used in forming the coating for the metallic material. Examples of suitable liquids which may be used either alone in certain instances, or in forming various suitable solvent mixtures are esters, such as butyl acetate; ketones such as acetone; glycol ethers, such as ethylene glycol monoethyl ether or diethylene glycol monobutyl ether; glycol ether esters, such as the acetate of ethylene glycol monoethyl ether; aromatic hydrocarbons, such as benzene, ethyl benzene and toluene; chlorinated solvents, such as ethylene dichloride and bis-beta-chloroethyl ether; and other related or equivalent solvents.

Vinyl resins are thermoplastic, and therefore the composite materials having vinyl resin-containing surfaces may be united or sealed by the application of heat and pressure. The composite materials also may be united or sealed by softening the vinyl resin-containing surfaces with solvents, followed by the application of pressure and elimination of the solvent.

The vinyl resin composition from which the composite materials are formed may be colored so that the appearance of the composite material will be enhanced or varied as desired. Dyes, pigments, and other coloring materials may be added to the composition as desired. The decorative effect may be further augmented by embossing or similarly processing the composite material.

For certain applications it may be desirable to strengthen metal foil by backing it with paper, or by laminating two or more foil layers. This may be done by slightly varying the formation of the metal foil-vinyl resin composite material. For example, a sheet of metal foil may be coated on both sides with a vinyl resin containing composition and then pressed into contact with a sheet of paper or second sheet of foil before and during the drying operation. This procedure results in a composite material composed of metal foil having one vinyl resin-containing surface and backed with paper or uncoated foil. The same type of material may be produced by hot pressing an initially produced composite metal foil and vinyl resin surfaced material against paper or foil to effect the union of the materials.

The following examples will serve to illustrate the invention:

I. A 34% solution in acetone of a vinyl resin resulting from the conjoint polymerization of 80% by weight of vinyl chloride and 20% by weight of vinyl acetate was prepared. Thirty-eight parts by weight of this solution were mixed with 4 parts by weight ethylene glycol monoethyl ether acetate, 10 parts by weight of acetone, and 35 parts by weight of ethylene dichloride. This composition was then used to coat tin and aluminum foils by a conventional roll type coating procedure and the solvents were removed in a drying tower.

Processed cheese was then packaged in the coated foil by pouring the molten cheese into molds lined with the composite material. The heat of the molten cheese served to soften slightly the vinyl resin surfaces and caused the lapped portions of the coated foil thus to be effectively sealed. The cheese wrapped in the new material showed no evidence of deterioration after several months storage at room temperature, and the vinyl resin coating of the wrapping material completely protected the metal foil from the corrosive action of the cheese as distinguished from ordinary metal foils which were attacked and badly corroded by cheese wrapped therein.

II. A coating composition which may be substituted for the composition in Example I with equally satisfactory results is as follows:

| | Parts by weight |
|---|---|
| 35% vinyl resin in toluene | 764 |
| ½ sec. nitrocellulose | 76 |
| Dibutyl phthalate | 64 |
| Ethylene glycol monoethyl ether acetate | 160 |
| Acetone | 1066 |
| Ethylene dichloride | 1068 |

The vinyl resin in this composition was one resulting from the conjoint polymerization of about 60% by weight of vinyl chloride and about 40% by weight of vinyl acetate.

III. The interiors of pint metal food cans were coated with a composition composed of the following:

| | Parts by weight |
|---|---|
| A 35% solution of vinyl resin in toluene | 100 |
| Ethylene dichloride | 50 |
| Ethylene glycol monoethyl ether acetate | 25 |

The vinyl resin was one resulting from the conjoint polymerization of about 80% by weight of vinyl chloride and about 20% by weight of vinyl acetate.

The composition was flowed onto the interiors of the cans which were drained and air dried. They were then baked for 30 minutes at 85° C. The cans were filled with orange juice and allowed to stand for one month at room temperature. At the end of this period the cans were opened and the orange juice was tested for odor, taste and appearance in comparison with juice from uncoated cans and from glass containers. In every case the juice kept in the vinyl resin surfaced cans was superior to juice kept in glass and in uncoated cans. No objectionable odor, color or taste was present in the juice from the cans surfaced with the vinyl resin.

IV. Tests in accordance with Example III were made with metal food cans surfaced in the same manner with each of the following compositions:

| | Parts by weight |
|---|---|
| 35% vinyl resin solution in toluene | 100 |
| Ethylene dichloride | 50 |
| Ethylene glycol monoethyl ether acetate | 25 | and

| | |
|---|---|
| 35% vinyl resin solution in toluene | 100 |
| Wet ½ sec. nitrocellulose | 8 |
| Dibutyl phthalate | 8 |
| Ethyl acetate | 15 |
| Butyl alcohol | 5 |
| Toluene | 30 |
| Ethylene glycol monoethyl ether | 5 |
| Ethylene glycol monoethyl ether acetate | 5 |

The vinyl resin used in the above compositions was one resulting from the conjoint polymerization of about 65% by weight of vinyl chloride and 35% by weight of vinyl acetate. The results obtained by using these compositions in the tests of Example III were equally as good as those obtained with the composition of Example III and the adhesion of these vinyl resin compositions to the metal surfaces was somewhat better than that of the composition of the preceding example.

Many modifications of the invention are possible. For example, metal plates may be surfaced with vinyl resins to form the composite material before it is shaped or formed into cans or other containers, and metal closures for glass or other containers may be protected by means of the invention. It is also possible to utilize the known thermoplasticity of the vinyl resin surfaces to effect a seal between containers of the composite materials and their closure means. Such modified embodiments of the invention are included within the invention as defined by the appended claims.

I claim:—

1. A food package comprising a metallic material having at least the surface thereof which is in contact with the food product to be packaged composed of a composition which contains a substantial proportion of a vinyl resin of the group including polymerization products of vinyl esters and mixtures of vinyl esters.

2. A food package comprising a metallic container the interior surface of which is composed of a composition containing a substantial proportion of a vinyl resin of the group including polymerization products of vinyl esters and mixtures of vinyl esters.

3. A food package comprising a food product enclosed in a metal foil wrapping having at least the surface thereof which is in contact with the packaged product composed of a composition containing a substantial proportion of a vinyl resin of the group including polymerization products of vinyl esters and mixtures of vinyl esters.

4. A food package which comprises a food product and a metallic packaging material having at least the surface thereof which contacts the packaged product composed of a composition which contains a vinyl resin substantially identical with a product resulting from the conjoint polymerization of vinyl chloride and vinyl acetate in the proportions of about 60% to 90% by weight of vinyl chloride.

5. A food package which comprises a food product and a metallic packaging material having at least the surface thereof which contacts the packaged product composed of a composition which contains a vinyl resin substantially identical with a product resulting from the conjoint polymerization of vinyl chloride and vinyl acetate in the proportions of less than about 65% by weight vinyl chloride, together with nitrocellulose.

6. Process of protectively packaging food products which comprises enclosing the food product in a metallic packaging material which has at least the surface thereof which is in contact with said food product composed of a composition which contains a substantial proportion of a vinyl resin of the group including polymerization products of vinyl esters and mixtures of vinyl esters.

7. As a new product, a package comprising cheese enclosed by and substantially sealed in a wrapping consisting essentially of metal foil which has at least the surface thereof in contact with said cheese composed of a composition which contains a substantial proportion of a vinyl resin of the group including polymerization products of vinyl esters and mixtures of vinyl esters.

8. As a new product, a package comprising cheese enclosed by and substantially sealed in a wrapping consisting essentially of metal foil which has at least the surface thereof in contact with said cheese composed of a composition which contains a vinyl resin substantially identical with a product resulting from the conjoint polymerization of vinyl acetate and vinyl chloride in the proportions of about 60% to 90% by weight vinyl chloride.

9. Process of protectively packaging cheese, which comprises pouring heated molten cheese into molds lined with a metallic packaging material which has at least the surface thereof which is in contact with the said cheese composed of a composition containing a substantial proportion of a vinyl resin of the group including polymerization products of vinyl esters and mixtures of vinyl esters, together with a plasticizer, thereby slightly softening the vinyl resin and causing lapped portions of the said surface of the packaging material to be effectively sealed.

RALPH B. FRAZIER.